April 27, 1926.

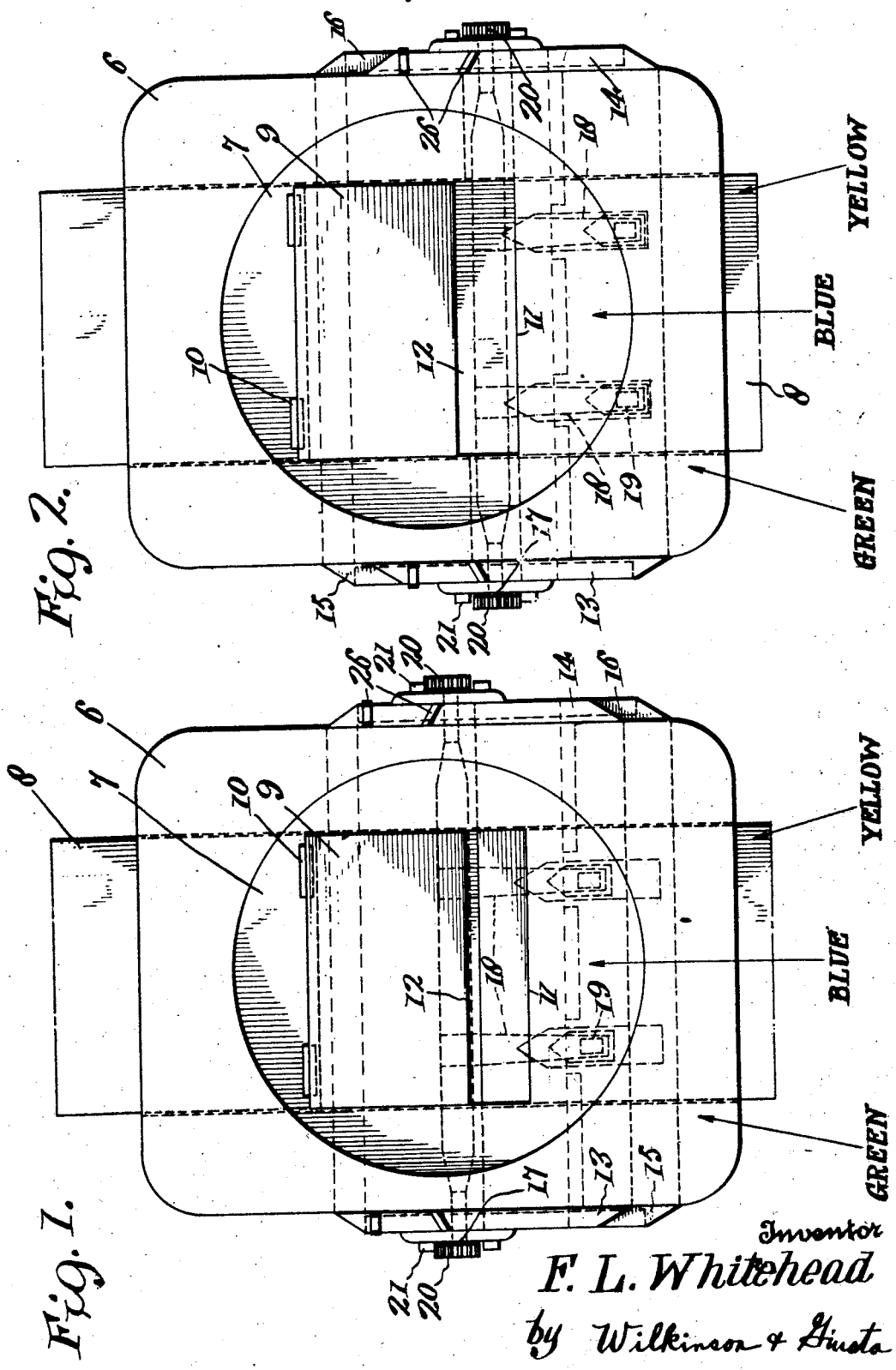

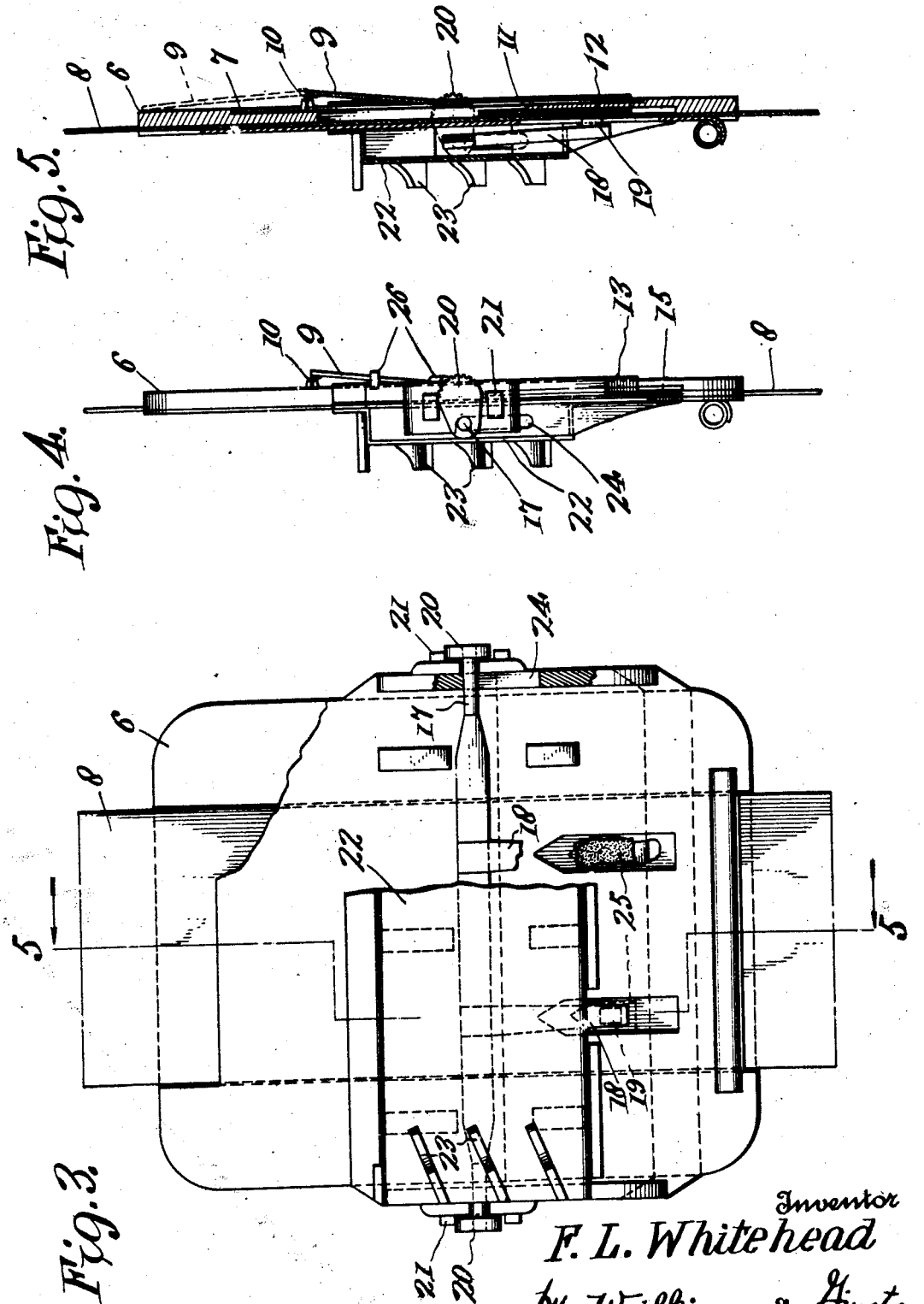

F. L. WHITEHEAD 1,582,810

EDUCATIONAL APPLIANCE

Filed May 4, 1923

Inventor
F. L. Whitehead
by Wilkinson & Giusta
Attorneys.

Patented Apr. 27, 1926.

1,582,810

UNITED STATES PATENT OFFICE.

FREDERICK L. WHITEHEAD, OF BUTTE, MONTANA.

EDUCATIONAL APPLIANCE.

Application filed May 4, 1923. Serial No. 636,615.

*To all whom it may concern:*

Be it known that I, FREDERICK L. WHITEHEAD, a citizen of the United States, residing at Butte, in the county of Silverbow and State of Montana, have invented certain new and useful Improvements in Educational Appliances; and I do hereby declare the following to be a full, clear, and exact description of the invention, such as will enable others skilled in the art to which it appertains to make and use the same.

The present invention relates to improvements in educational appliances and consists in a device for encouraging in the student habits of concentration and attention to the subject matter in hand.

It is assumed that parallel and simultaneously with the mental development of the human race, three color sensations were always present in conscious experience or consciousness, the blue of the sky, doubtless vivified by traces of volcanic vapors in the upper regions, the yellow of sunlight rendered brilliant by the same vapors, and the verdant green, where the creatures lived and maintained their existence.

During untold ages the three colors were directly connected with the complex neural processes slowly developing within the human brain. In the course of time the sensations of blue, green and yellow became a component of all of the higher brain centers, that is, there is no specific center for blue or green or yellow but they belong to all of the centers.

It is obvious that the visual sensations of blue, green and yellow would be compatible with the further development of the higher brain centers and the paths leading from center to center, and would be the continuation of principles which have been in progress for ages.

And so what I claim as new in my invention is a process of mental development in which the visual color sensations of blue, green, and yellow are employed as additional external stimuli to the subject matter to be mentally acquired. This is accomplished by a central field giving the visual sensation of blue, an outer field giving the visual sensation of green, and a central movable sheet giving the visual sensation of yellow. Characters, symbols, drawings and other data representing values, meanings, symbolic thought, ideas and images are printed upon the movable sheet, and the combination is so arranged that when the printed matter appears in an opening in the central blue field and is observed and studied the visual sensations of blue, green and yellow will be present in the student's conscious experience simultaneously with the meanings, values, ideas, and data conveyed by the printed matter.

The invention has for an object to provide a simple and convenient appliance for presenting to the student subject matter in conformity with the above-outlined idea.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a top plan view showing an improved appliance constructed according to the present invention with the parts in one position.

Figure 2 is a similar view with the parts illustrated in the subsequent position.

Figure 3 is a bottom plan view with parts broken away.

Figure 4 is an edge view,

Figure 5 is a section taken on the line 5—5 in Figure 3, and

Figure 6:
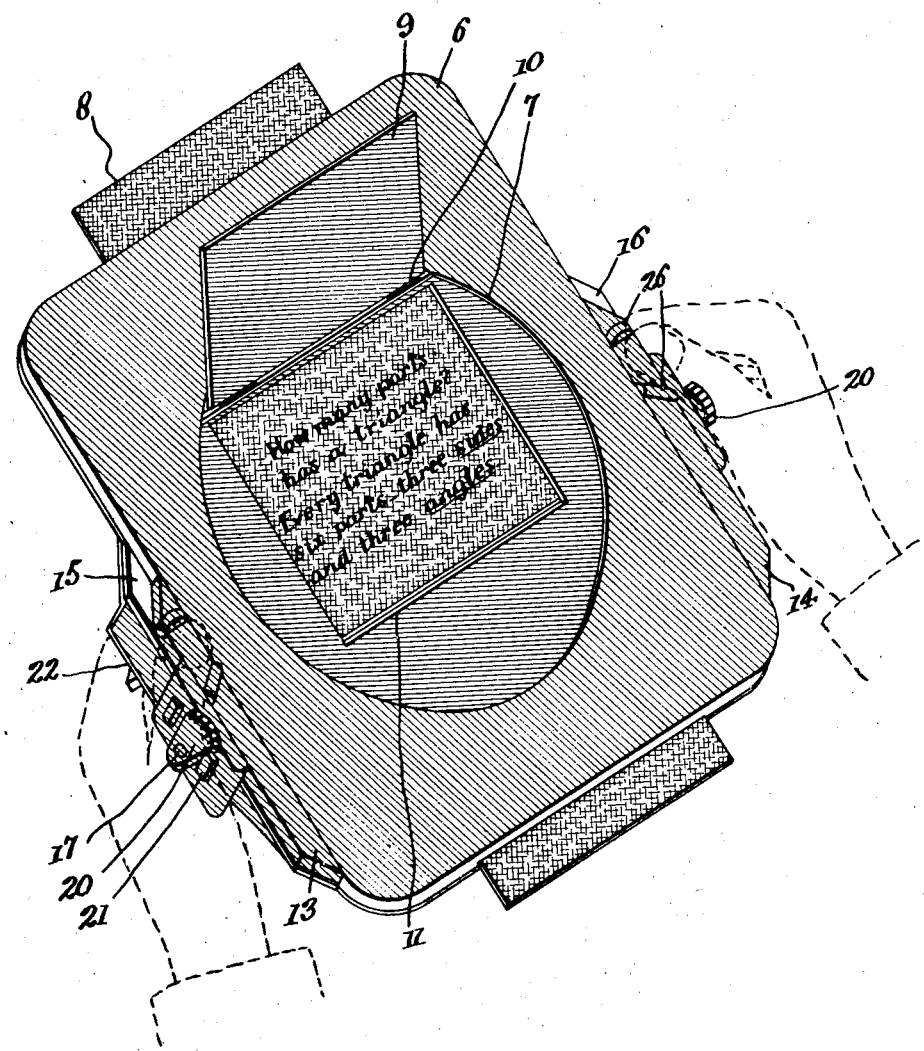
Figure 6 is a perspective view of the educational appliance held in the hands in position for use.

Referring more particularly to the drawings the device consists of a board 6 of appropriate size and dimensions preferably being of the substantially rectangular form shown and being represented in the color green.

Centrally, this board is provided with a disc 7 of a blue color and the central part of the disc is cut away to reveal a yellow strip or web 8 on which the subject matter for the attention of the user of the device is printed or otherwise displayed. This subject matter may consist of question and answer or a table of words for use in teaching spelling and pronunciation, but it will be obvious that any data may be borne by the yellow strip.

The yellow strip 8 is adapted to slidably fit within the appliance and the major portion of the strip and central opening in the disc 7 are normally concealed by a blue curtain 9 hinged as indicated at 10 to the upper portion of the disc. As indicated in dotted lines in Figure 5 this curtain may be thrown upwardly by a quick, swinging movement of the appliance away from the person of the user, followed by a sudden stop, whereupon, by its own inertia, the curtain will be carried to its open position. The hinge being remote from the disc 7 and board 6 enables the curtain to rest in an inclined position, as shown in Fig. 5 in dotted lines. The lower edge of the curtain 9 terminates short of the base 11 of the opening in the disc 7 and through this opening the yellow sheet appears. A movable blue shutter 12 is carried between this lower edge 11 of the opening and the lower edge of the curtain 9, the adjacent edges of the curtain and shutter being adapted to close or approximately close together as indicated in Figure 2. The shutter 12 is carried by slides 13 and 14 at the sides of the appliance mounted upon celluloid or other smooth bases 15 and 16.

The slides also carry a shaft 17 upon which are mounted one or more clutch fingers 18 having pads or tips 19 of rubber, rough sand paper, or other material. These tips or lugs are adapted to engage the yellow strip or web 8 at its under side whereby to advance the same a predetermined distance at each recurring movement of the slides. The shaft 17 is adapted to rock to permit the clutch fingers 18 to disengage the paper strip on the down stroke and this rocking movement of the shaft is affected automatically in the act of moving the slides by virtue of the engagement of the thumbs of the operator with eccentrics 20 mounted upon the ends of the shaft 17. The movement of the eccentrics need only be a slight one and stops 21 are provided to restrict the movement in either direction.

The shaft and the clutch fingers are enclosed in a casing 21, the bottom of which along the side edges is provided with a number of inclined webs 23 between which the fingers of the operator are adapted to engage while the thumbs rest upon the toothed or roughened parts of the eccentrics 20. The shaft 17 extends through slots 24 made in the side walls of the casing and the ends of the slots limit and arrest the slides at opposite ends of the movement thereof.

The under face of the blue shutter may be provided with appropriate rough material as indicated at 25 to grip the yellow sheet 8 upon the side opposite that gripped by the finger tips 19. Finger stops or guides 26 are provided also upon the upper faces of the slides for use in manipulating the slides without effecting any movement of the strip.

The yellow sheet or web 8 may be mounted upon a roll and fed from the roll as the slides are moved back and forth or the sheet may be simply a straight sheet threaded through the machine but this in unimportant.

In operation the apparatus is held in both hands like an open book, with thumbs resting lightly on thumb slides. The balls of the thumbs are pressed against the thumb eccentrics 20 which cause the clutch pads 19 to grip the yellow sheet 8 and the sheet is moved up until for instance the question; What is science? etc., appears isolated in the narrow slot between the shutter and the curtain. The isolation of the question tends to develop the interrogative or problem attitude in the student. When the question is fully understood the shutter is slowly moved down exposing the answer, isolated, clear, and distinct. The psychological principle involved here is that when the brain assimilates an idea it first isolates it, and an impression must be isolated to come to its full mental effectiveness. After the answer is studied the shutter is moved back and the student can reflect on the answer with no other subject matter to distract his mental operation. In spelling the words are isolated in the narrow slot and studied singly and alone. The shutter also has the office of blotting out the subject matter while a mental review is being made. The function of the process is to develop in the students mentality the permanent habits of close attention, strong concentration, clear perception, accurate visualization, and rational thought to awaken the latent powers of the mind and enlarge the sphere of consciousness.

It is obvious that various changes and modifications may be made in the details of construction and design of the above specifically described embodiment of this invention without departing from the spirit thereof, such changes and modifications being restricted only by the scope of the following claims:—

What is claimed is:—

1. An educational appliance comprising a board represented in the color green and having a glue field therein with an opening in the center thereof, and a yellow sheet containing the subject matter for reading movable beneath said board and exposed through the opening therein.

2. An educational appliance comprising a board represented in the color green, a central disc in the board represented in the color blue, a sheet represented in the color yellow arranged beneath said board and exposed through the blue disc and means to advance said yellow sheet.

3. An educational appliance comprising a green board having a central blue field provided with an opening therein, a yellow sheet containing reading matter disposed beneath the board and revealed through the opening, a movable blue curtain partially closing said opening, and a blue movable shutter cooperating with said curtain and adapted to move toward and away from said curtain.

4. An educational appliance comprising a green board having a central blue field provided with an opening therein, a yellow sheet containing descriptive matter arranged beneath said board and exposed through the opening, a hinged blue curtain partially masking said opening, a blue shutter cooperating with said curtain and being movable toward and from the same, and movable slide means for shifting said curtain and having means to advance the yellow sheet past the opening.

5. An educational appliance comprising a green board having a central blue field with an opening therein, a blue curtain hinged at one side of the opening, a blue shutter moving toward and from the free edge of said curtain, slides at the side of said board for movement by the hands of the user, and connected to reciprocate said shutter, and means associated with said slides for engaging and advancing the yellow sheet intermittently.

6. An educational appliance comprising a board having a central opening, a sheet beneath the board exposed through the opening, a curtain hinged at the top edge of the opening, a shutter reciprocating toward and from the free edge of the curtain, slides reciprocating at the sides of said board and connected to said shutter, a rock shaft carried in said slides, arms connected to said rock shaft, and having friction tips adapted to engage the sheet, eccentrics on the ends of said rock shaft for engagement by the thumbs of the operator, a casing to enclose the reverse face of said board and the rock shaft and arms, and finger rests upon the rear side of said casing and upon said slides.

7. An educational appliance comprising a board provided with a central opening, a plate provided with a plurality of slots for covering the opening, said plate mounted on the rear face of the board in spaced relation therewith, a lesson sheet slidable between the plate and board, and visible through the opening in the board, a frame slidably mounted on the board, a rocker shaft carried by the frame, a plurality of fingers carried by the shaft and adapted to engage the rear face of the lesson sheet through the slots in the cover plate, and means to reciprocate the frame and rock the shaft whereby to move the lesson sheet intermittently with respect to the board.

8. An educational appliance comprising a board, a lesson sheet slidably mounted thereon, a slidable frame carried by the board, a rocker shaft carried by the frame, fingers carried by the shaft, means to rock the shaft to move the fingers into and out of engagement with the lesson sheet, and means to reciprocate the frame with respect to the board, whereby to move the sheet intermittently.

9. An educational appliance comprising a board, a lesson sheet slidably mounted thereon, a frame slidable on the board, and means carried by the frame for intermittently engaging the sheet whereby to move the same step by step with respect to the board.

FREDERICK L. WHITEHEAD.